United States Patent [19]
Yamamoto et al.

[11] Patent Number: 5,475,983
[45] Date of Patent: Dec. 19, 1995

[54] METHOD AND APPARATUS FOR TREATING MATERIAL UNDER PRESSURE

[75] Inventors: Seiichi Yamamoto; Takeshi Kanda, both of Kobe, Japan

[73] Assignee: Kabushiki Kaisha Kobe Seiko Sho, Kobe, Japan

[21] Appl. No.: 265,935

[22] Filed: Jun. 27, 1994

[30] Foreign Application Priority Data

Jun. 29, 1993 [JP] Japan .................................. 5-159409
Apr. 20, 1994 [JP] Japan .................................. 6-081828

[51] Int. Cl.$^6$ ............................................. F25D 25/00
[52] U.S. Cl. ........................ 62/62; 62/78; 62/383; 62/465
[58] Field of Search .................... 62/62, 78, 383

[56] References Cited

U.S. PATENT DOCUMENTS

| | | | |
|---|---|---|---|
| 2,509,299 | 5/1950 | Grom | 62/62 |
| 2,662,520 | 12/1953 | McMahon | 62/62 |
| 3,729,947 | 5/1973 | Higuchi | 62/78 |
| 4,559,298 | 12/1985 | Fahy | 62/78 |

Primary Examiner—Ronald C. Capossela
Attorney, Agent, or Firm—Oblon, Spivak, McClelland, Maier & Neustadt

[57] ABSTRACT

Disclosed herein are a method and apparatus for industrially freezing (or cooling) food or the like under pressure. The method consists of isostatically exerting pressure on the material such as food (14) and the frozen body (15) composed mainly of water through the pressure medium (12) contained in the pressure vessel (1), thereby cooling the material (14). When the temperature of the material (14) decreases below 0°C. at which freezing does not take place under pressure, the pressure is released rapidly so that fine ice crystals are formed in the material (14). The apparatus comprises a pressure vessel (1) having therein a high-pressure chamber (6) which can be supplied with a pressure medium (8), a treating vessel (9) in said high-pressure chamber (6), said treating vessel (9) having therein a treating compartment (13) containing a pressure medium (12) to apply isostatic pressure, and a plurality of trays (16) removably arranged in the treating compartment (13) in its axial direction, each of said trays holding the material (14) and the frozen body (15) composed mainly of water.

11 Claims, 8 Drawing Sheets

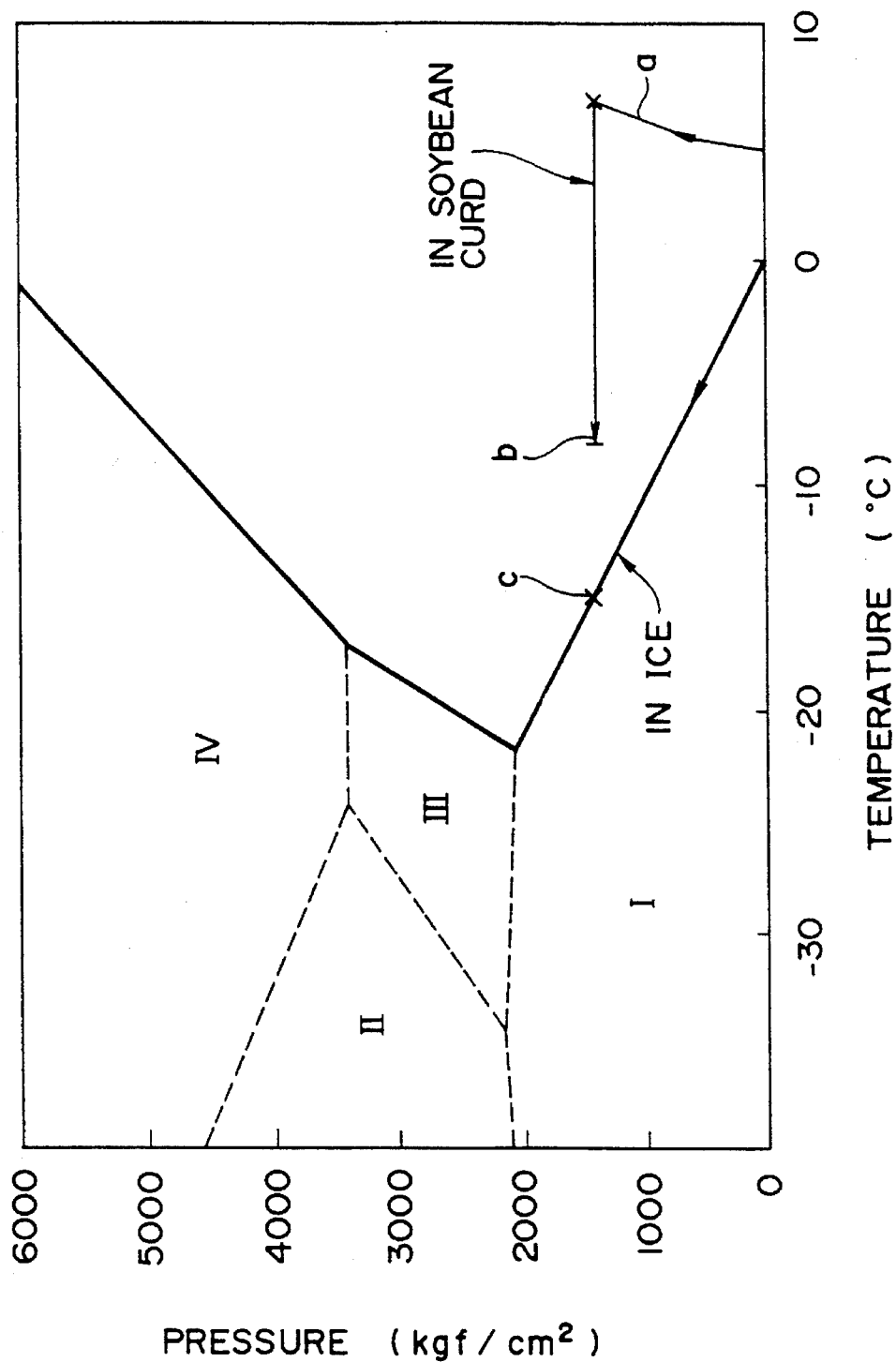

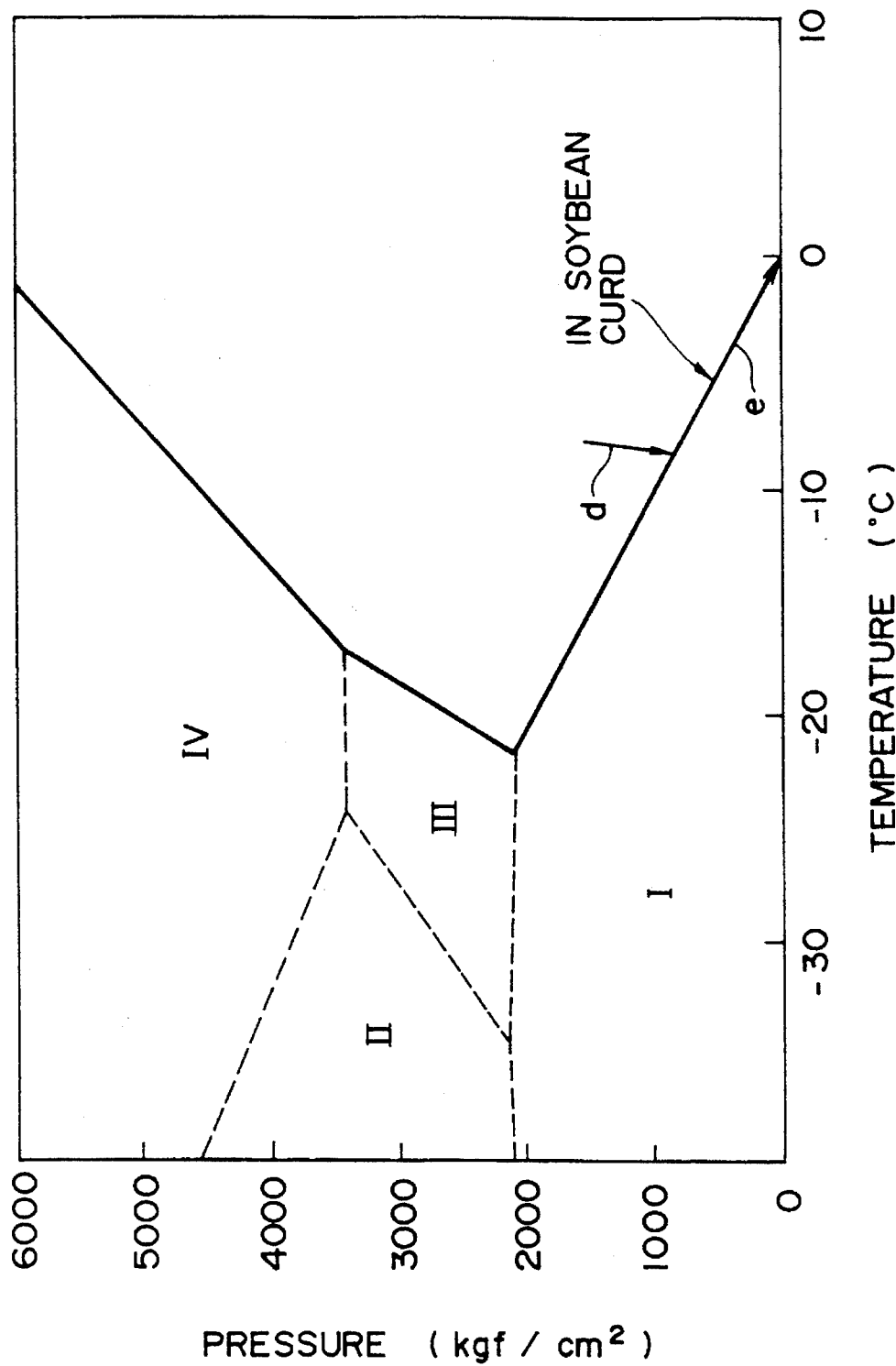

F I G. 5
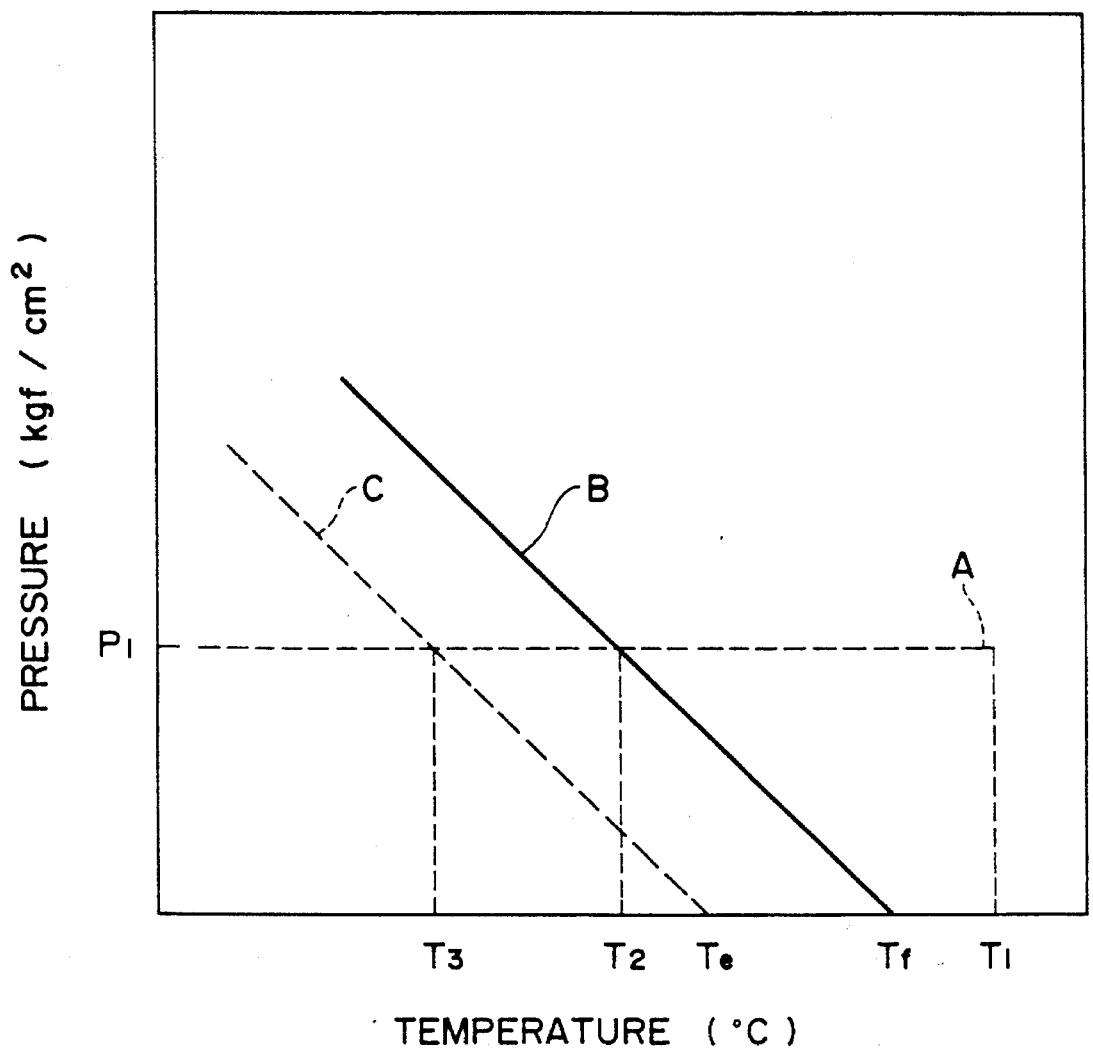

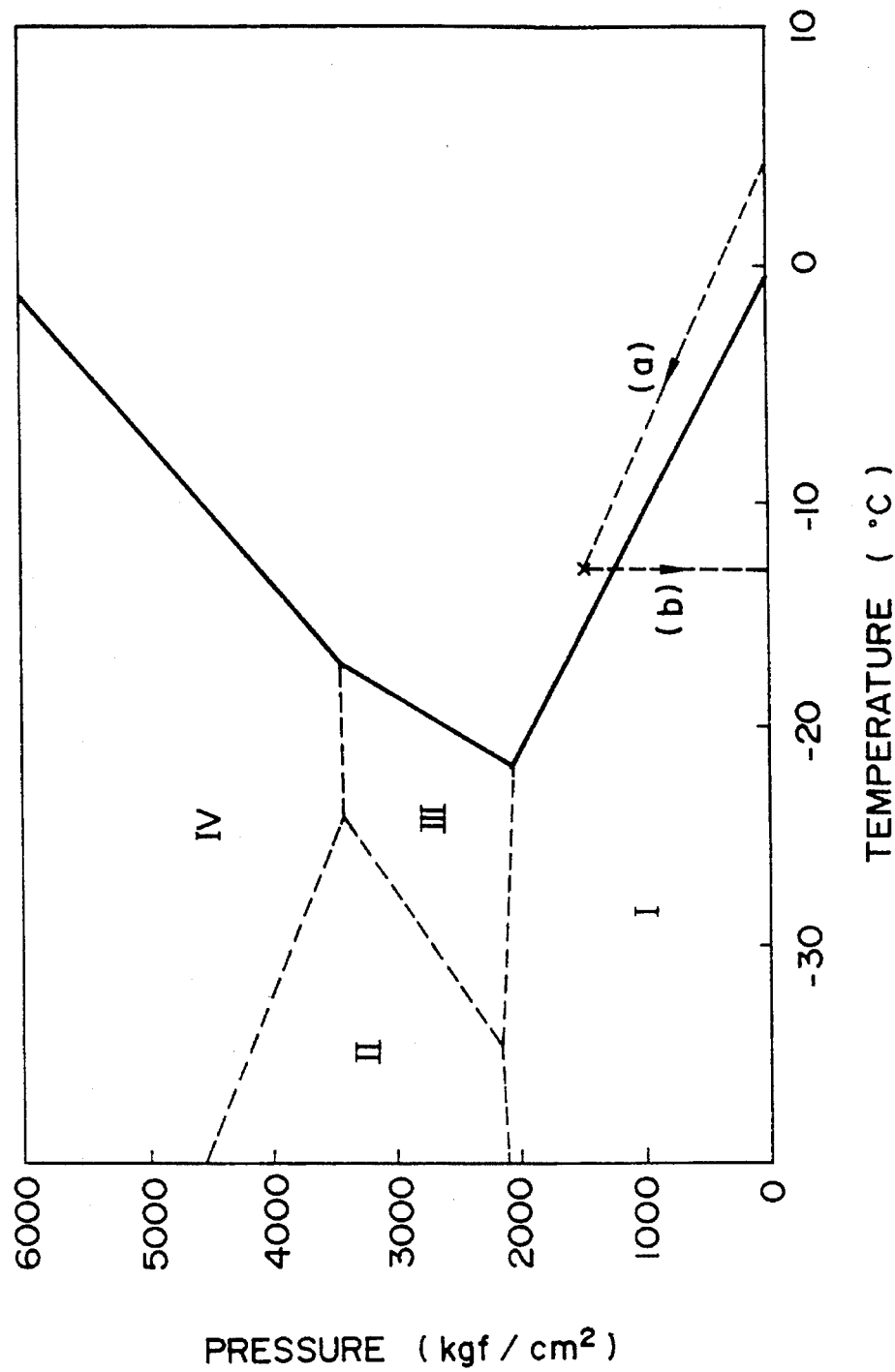

METHOD AND APPARATUS FOR TREATING MATERIAL UNDER PRESSURE

BACKGROUND OF THE INVENTION

1. Field of the Invention

The present invention relates to a method and apparatus for treating material under pressure, and more particularly to a method and apparatus for cooling and freezing foods.

2. Description of the Prior Art

Cooling of foods, especially freezing of foods, is usually accomplished under atmospheric pressure using a freezing apparatus. The rate of cooling is determined by the thermal conductivity of food. This results in slow cooling or freezing, which in turn forms large ice crystals in food to impair its quality. For this reason, it has been difficult to freeze soybean curd, agar-agar, "konjak" (a hard jelly made from the starch of devil's tongue), and the like.

In order to overcome this difficulty, there has been proposed a method of freezing food by means of cooling and pressurizing in combination. (See "Shokuhin to Kaihatsu" (Foods and Development), vol. 26, No. 12, 1992.) This method is called a pressurizing-depressurizing freezing method. This method utilizes the unique property of water that water in food does not freeze under pressure. According to the above-cited reference, this method consists of placing a food (soybean curd) with a pressure medium in a pressure vessel provided with a jacket in which a cooling medium is circulated, pressurizing the contents of the vessel such that the food is isostatically compressed, cooling the vessel so that the temperature of the food reaches a temperature below 0° C. but still above the freezing temperature under pressure, and rapidly depressurizing the contents of the vessel. In the pressurizing and cooling process, the pressure in the vessel increases to 1500 kgf/cm$^2$ and the temperature in the vessel decreases to −13° C. along the path (a) shown in FIG. 6. In the depressurizing process, the pressure in the vessel decreases along the path (b) shown in FIG. 6. The rapid pressure decrease in the vessel causes water in the food to shift from liquid phase to solid phase, forming fine ice crystals instantaneously. The resulting frozen food restores its original quality upon thawing, unlike the conventional frozen food produced by slow freezing.

The pressurizing-depressurizing freezing method is also disclosed in Japanese Patent Laid-open Nos. 216430/1985, 94664/1991, 148667/1992, 158772/1992, 271772/1992, and 49461/1993, in addition to the above-cited reference.

The pressurizing-depressurizing freezing method (conventional method) mentioned above has the disadvantage of requiring an extremely long time for cooling because the cooling along the path (a) is achieved by the circulation of a cooling medium through the jacket attached to the outside of the pressure vessel and heat transmission through the thick wall of the vessel is very poor. It is of no practical use although it is theoretically possible.

SUMMARY OF THE INVENTION

It is a first object of the present invention to provide a new, practical method and apparatus for rapidly treating material under pressure by pressurizing it isostatically together with a frozen body composed mainly of water in a pressure vessel.

It is a second object of the present invention to provide a method and apparatus for rapidly cooling material by pressurizing it isostatically together with a frozen body composed mainly of water in a pressure medium, said method effectively utilizing the freezing point depression of the frozen body that takes place under pressure.

It is a third object of the present invention to provide a method and apparatus for industrially producing new foods (such as frozen soybean curd) which have never been produced by the conventional method and apparatus. The method and apparatus permit the instantaneous freezing of food in an industrially acceptable short time. This is achieved by properly controlling the cooling temperature under pressure and releasing the pressure at a temperature below 0° C., with freezing continued under atmospheric pressure after depressurization.

It is a fourth object of the present invention to provide a method and apparatus for freezing material by pressurizing it together with a frozen body composed mainly of water, both being in direct contact with each other for the maximum efficiency in a heat-insulating vessel placed in the pressure vessel. The method and apparatus obviate the necessity of cooling the pressure vessel, which contributes to cost reduction and industrial acceptance.

It is a fifth object of the present invention to provide a method and apparatus for freezing foods in a shorter time by employing a frozen body of an aqueous solution of a solute such as a salt which lowers the freezing point of water. The method and apparatus can be safely applied to food processing if the solute is selected from substances approved as food additives by the Food Sanitation Law.

BRIEF DESCRIPTION OF THE DRAWINGS

FIG. 1(B) is a phase diagram of water at the time of pressurization. FIG. 1(C) is a phase diagram of water at the time of depressurization.

FIG. 5 is a diagram showing the relation between the pressure and the freezing point of water and salt aqueous solution.

FIG. 6 is a phase diagram of water with the process of the pressurizing-depressurizing freezing method in the prior art technology.

DESCRIPTION OF THE PREFERRED EMBODIMENTS

Figure 1A:
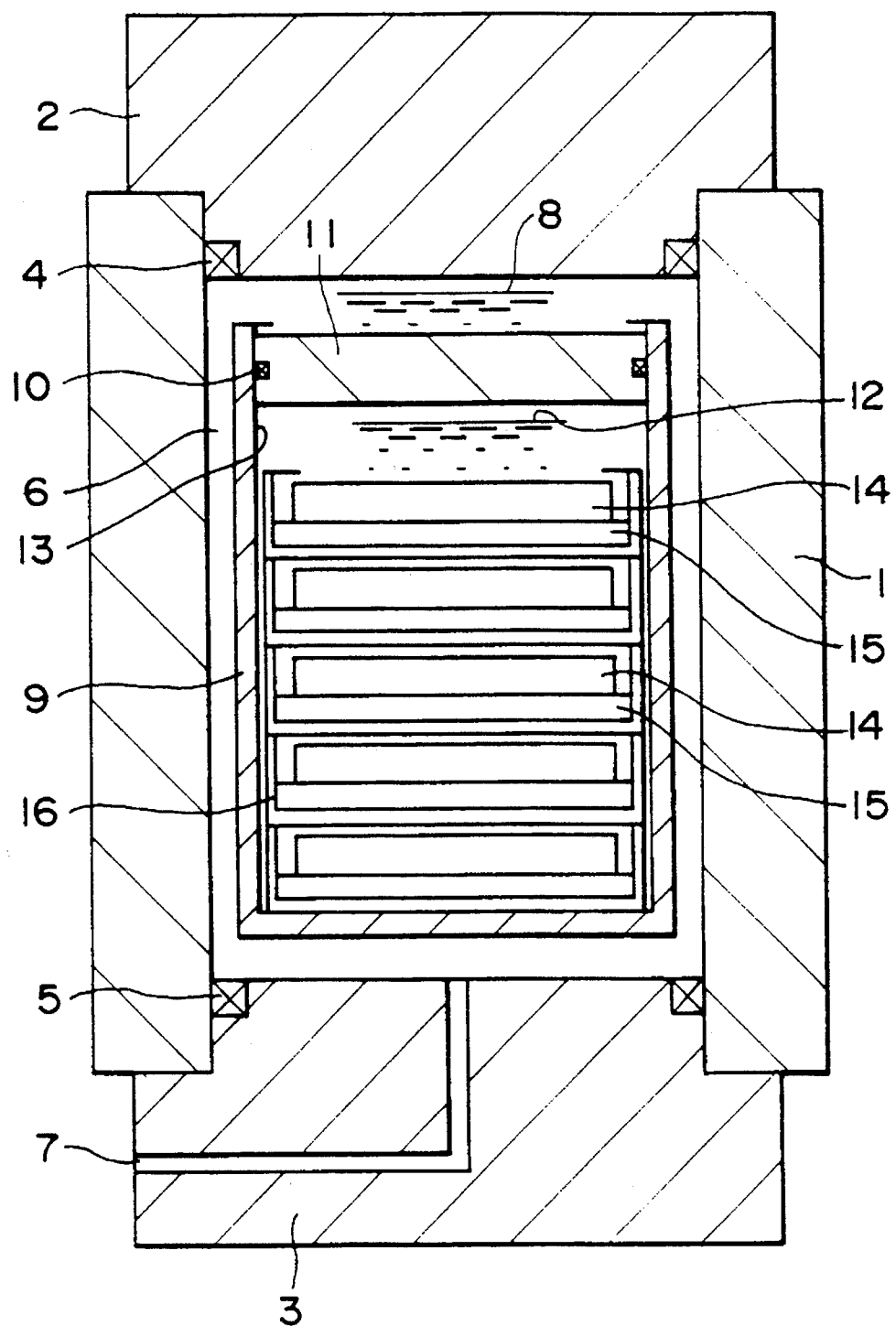
FIG. 1(A) is a sectional view of the apparatus used in the first example of the present invention.

The above-mentioned objects of the present invention are achieved by the following technical means.

The first aspect of the present invention resides in a method of treating material (14) under isostatic pressure in a pressure vessel (1), said method comprising applying pressure to the material (14) together with a frozen body (15) composed mainly of water whose amount is in an arbitrarily selected ratio to the weight of the material, thereby bringing the average temperature of the material (14) to the vicinity of the predetermined temperature after pressurization.

The second aspect of the present invention resides in a method of treating under pressure material (14) which is a water-containing food, said method comprising applying pressure isostatically to the material (14) and a frozen body (15) composed mainly of water through a medium (12), maintaining the pressure such that the material (14) does not freeze at its average temperature below 0° C., and releasing pressure rapidly, thereby forming ice crystal nuclei in the material (14).

The third aspect of the present invention resides in a method of treating material under pressure as defined in the second aspect, wherein the material (14), which is a water-containing food, and the frozen body (15) composed mainly of water each is airtightly sealed in a bag, with the former being placed on the latter.

The fourth aspect of the present invention resides in a method of treating material under pressure as defined in the second and third aspects, wherein the material (14) and the frozen body (15) are placed in a heat-insulating vessel (9) containing the medium (12).

The fifth aspect of the present invention resides in a method of treating material under pressure as defined in the second and third aspects, wherein the material (14) in which ice crystal nuclei have been formed undergoes freezing under atmospheric pressure.

The sixth aspect of the present invention resides in a method of treating material under pressure as defined in the first to fourth aspects, wherein the frozen body (15) composed mainly of water is a frozen body of an aqueous solution of a solute such as a salt which lowers the freezing point of water. Such a frozen body rapidly cools the material under pressure to a predetermined temperature below 0° C.

The seventh aspect of the present invention resides in a method of treating material under pressure as defined in the sixth aspect, wherein the solute is a substance approved as a food additive by the Food Sanitation Law.

The eighth aspect of the present invention resides in an apparatus for treating material under pressure, said apparatus comprising a pressure vessel (1) having therein a high-pressure chamber (6) which can be supplied with a pressure medium (8), a treating vessel (9) in said high-pressure chamber (6), said treating vessel (9) having therein a treating compartment (13) containing a pressure medium (12) to apply isostatic pressure, and a plurality of trays (16) removably arranged in the treating compartment (13) in its axial direction, each of said trays holding the material (14) and the frozen body (15) composed mainly of water.

The ninth aspect of the present invention resides in an apparatus for treating material under pressure as defined in the eighth aspect, wherein the frozen body (15) composed mainly of water is a frozen body of an aqueous solution of a solute such as a salt which lowers the freezing point of water. Such a frozen body rapidly cools the material under pressure to a predetermined temperature below 0° C.

The tenth aspect of the present invention resides in an apparatus for treating material under pressure as defined in the ninth aspect, wherein the solute is a substance approved as a food additive by the Food Sanitation Law.

According to the present invention, the pressure vessel (1) contains the medium (12) in which are immersed the material (14) and the frozen body (15) composed mainly of water. The medium is pressurized so that the material (14) and the frozen body (15) are isostatically compressed. This compression, which lasts for a while, lowers the melting point of the frozen body (15) and causes the frozen body (15) to melt under pressure. This contributes to the rapid cooling of the material (14). With the amount of heat required to cool the material (14) and the medium (12) balanced with the amount of latent heat released, it is possible to keep the water in the material (14) in liquid state under pressure without causing it to freeze. Then, the pressure vessel (1) is rapidly depressurized so that the temperature in the material (14) rapidly reaches 0° C. at which water and ice coexist under atmospheric pressure. The amount of heat equivalent to this temperature rise is utilized for rapid freezing.

EXAMPLES

The examples of the invention will be described with reference to the accompanying drawings.

FIG. 1(A) shows in section the apparatus in the first example. There is shown the pressure vessel (1), which is a cylindrical object with both the upper and lower ends opened. The upper opening is closed by the upper lid (2) which is removably fitted thereinto with the seal (4) inserted between them. The lower opening is closed by the lower lid (3) which is removably fitted thereinto with the seal (5) inserted between them. The closed pressure vessel forms therein the high-pressure chamber (6).

The high-pressure chamber (6) is supplied with the pressure medium (8) such as water by a pressure pump through the passage (7) formed in the lower lid (3). The pressure of the pressure medium (8) is controlled by a control valve (not shown).

During pressurization, the axial force applied to the upper and lower lids (2, 3) is supported by a press frame (not shown).

The high-pressure chamber (6) holds therein the treating container (9) which can be removed through the upper opening of the pressure vessel (1). The treating container (9) is a cylindrical object made of a heat-insulating material, such as polyethylene, with its bottom closed. The upper opening of the treating container (9) is closed by the piston (11) which is slidably fitted thereinto with the seal (10) inserted between them. The treating container (9) and the piston (11) form the treating compartment (13) containing the treating medium (12) which is a water-propylene glycol mixture or the like. The treating medium (12) exerts isostatic pressure as the piston (11) moves down. In the treating medium (12) are immersed the material (14) and the frozen body (15) composed mainly of water.

The material (14) to be treated may be a water-containing food (such as soybean curd, konjak, and agar-agar) or a liquid (such as pharmaceutical preparations). The frozen body (15) may be ice (of distilled water), ice (of water containing a small amount of propylene glycol), or ice (of water containing a small amount of salt or sugar).

The material (14) and the frozen body (15) should preferably be tightly sealed separately in a bag of polyethylene or the like. One each of them is placed in the tray (16), and several of the trays (16) are piled up in the container.

It is important that the material (14) be placed directly on the frozen body (15) to ensure good heat transfer from the latter to the former.

In the case where the frozen body is mere ice, the material and ice may be sealed in the same bag and this is desirable for good heat transfer. However, it is still recommended that they be sealed separately so as to recycle the ice and to handle the material easily.

Figure 2:
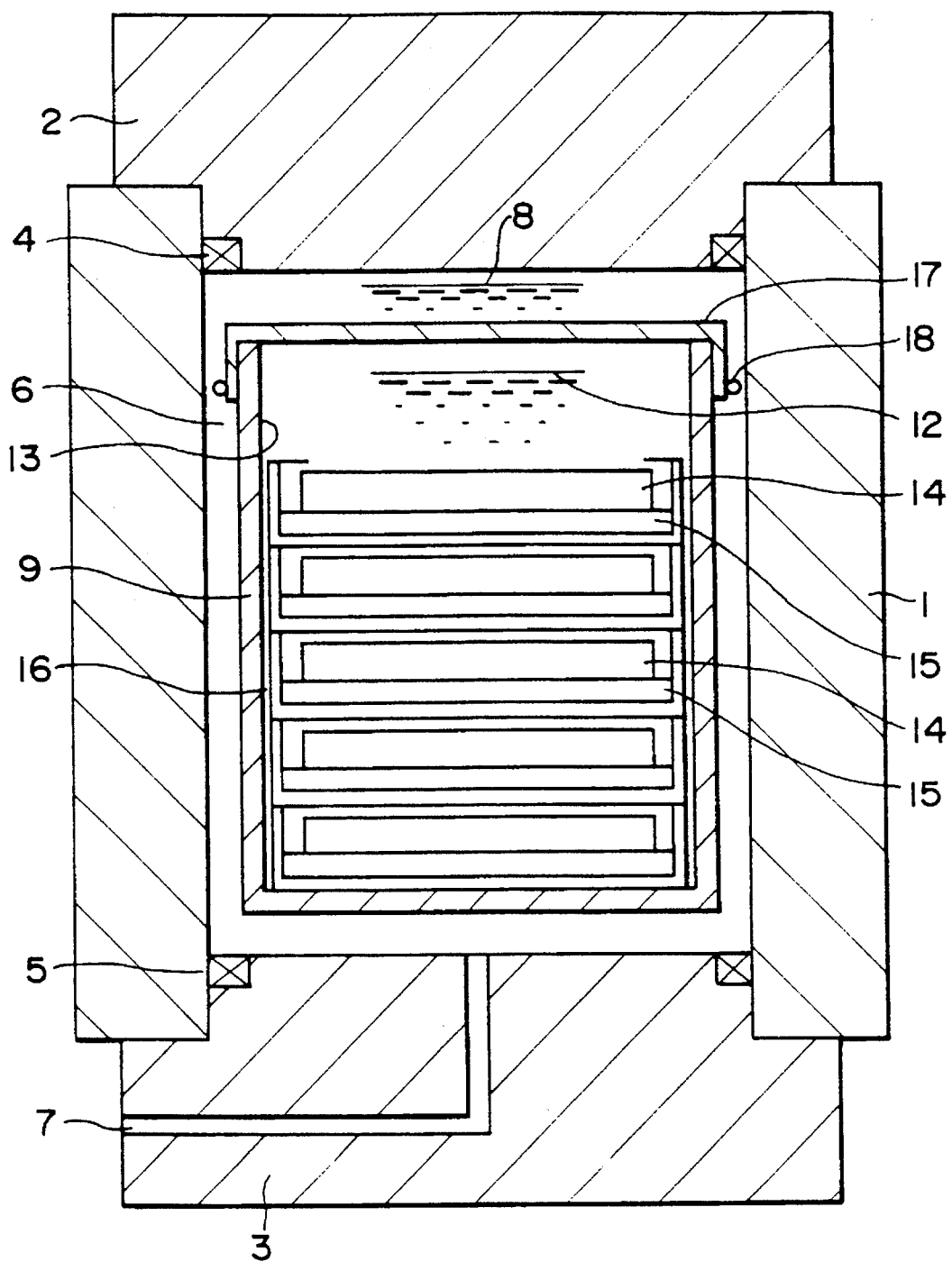
FIG. 2 is a sectional view of the apparatus used in the second example of the present invention.

FIG. 2 shows in section the apparatus in the second example. The apparatus is the same as that shown in FIG. 1(A) except the following. (Like reference characters designate like or corresponding parts.) The treating compartment (13) is formed by the treating container (9) and the elastic lid (17) of rubber or the like fixed to its upper opening by the band (18). The treating medium (12) exerts isostatic pressure as the elastic lid (17) undergoes elastic deformation.

In the first and second examples, the apparatus is operated as follows. First, the material (14) and the frozen body (15) are immersed in the treating medium (12) in the treating container (9). Then, the treating container (9) is placed in the high-pressure chamber (6) through the upper opening of the pressure vessel (1). The high-pressure chamber (6) is supplied with the pressure medium (8) through the passage (7) formed in the lower lid (3). The pressure medium (8) pushes down the piston (11) or deforms the elastic lid (17). This causes the treating medium (12) to exert isostatic pressure on the material (14).

Incidentally, the pressure medium (8) may be supplied cool by passing through a cooler. In this case, it is not always necessary to completely separate the pressure medium (8) from the treating medium (12); they may be used as the same pressure medium. In this case, too, it is desirable that heat insulation be provided for the material and frozen body.

Experiments with soybean curd (as the material) and ice (as the frozen body) were carried out as follows using the apparatus shown in FIG. 1(A).
Experiment 1

A piece of soybean curd (measuring 8×8×2 cm) was sealed in a thin polyethylene bag and cooled to 5° C., and also a piece of ice (measuring 8×8×0.5 cm) was sealed in a thin polyethylene bag. They were placed on the tray, the former being on the latter. Ten tiers of the trays were placed in the treating container of polyethylene, 140 mm in inside diameter and 25 mm thick. The treating container was filled with the treating medium (aqueous solution of propylene glycol) cooled to 5° C. The treating container was placed in the high-pressure chamber (200 mm in inside diameter) through its upper opening. With the upper lid closed, the pressure vessel was pressurized to 1500 kgf/cm$^2$ within 1 minute without external cooling.

As the result of this isostatic pressurization, the temperature of the soybean curd rose to 7° C. as indicated by the path (a) in FIG. 1(B). This is due to the compression of water in the soybean curd. The average temperature of the soybean curd itself rises with the increasing pressure.

On the other hand, the freezing point of the frozen body (15) continuously decreased with the increasing pressure up to 2000 kgf/cm$^2$ as indicated by the phase diagram of FIG. 1(B). The result was an accumulation of latent heat of melting.

The pressure was raised to 1500 kgf/cm$^2$ and this pressure was maintained for 15 minutes. After that, the temperature at the center of the soybean curd was measured using a thermocouple built into the treating compartment. It was found that the temperature was −8° C. as indicated by "b" in FIG. 1(B).

The fact that the freezing point of the frozen body decreased to about −15° C. under a high pressure of 1500 kgf/cm$^2$ as indicated by "c" in FIG. 1(B) resulted in the fast cooling of the soybean curd (at 7° C.) and the treating medium. In other words, the pressurization brings about the freezing point depression of ice (the frozen body) and release the latent heat, which led to the rapid cooling of the soybean curd. What is important to note is that water in the soybean curd remains liquid (not frozen). For this reason, it is possible to rapidly cool the liquid phase to a temperature below 0° C. without freezing the water in the soybean curd, if the amount of heat required to cool the soybean curd and pressure medium is balanced with the amount of ice (which determines the amount of latent heat).

In the meantime, an experiment with the same soybean curd as mentioned above was carried out using the prior art technology (the pressurization-depressurization freeing method). In this experiment, the pressure vessel was pressurized to 1500 kgf/cm$^2$ and was externally cooled to −15° C. with a cooling medium. The time required to reach the above-mentioned stage was about 4 hours. This suggests the usefulness of the present invention according to which the material and the frozen body are immersed together in the treating medium under pressure.

After pressurization, pressure was released within 1 minute as indicated by "d" in FIG. 1(C). It was found that the temperature in the soybean curd returned to about 0° C. and the soybean curd was in the uniform frozen state, with fine ice crystals uniformly dispersed therein.

With pressure released, the temperature inside the soybean curd (in which water accounts for a large part) rose from −8° C. to 0° C. (at which water and ice coexist under atmospheric pressure) along the path (e) in FIG. 1(C). This implies that the amount of heat corresponding to the temperature rise was utilized for freezing.

The foregoing phenomenon will be described in more detail in the following. Under high pressure, water in the soybean curd is liquid and is at a low temperature below 0° C. Upon depressurization, water in the soybean curd starts to freeze instantaneously along the water-ice I line emitting the latent heat as indicated by the phase diagram in FIG. 1(C). The result is partial freezing, with fine ice crystals uniformly dispersed. After freezing, the temperature in the soybean curd approaches 0° C. along the path (e), which is the freezing temperature at (the) atmospheric pressure.

The partially frozen soybean curd was further frozen to freeze completely to −20° C. under atmospheric pressure and was stored at that temperature for 1 week. Upon thawing, it returned to soybean curd which tasted as good as unfrozen soybean curd. This result demonstrates that the method and apparatus mentioned above can be industrially used for the production of frozen soybean curd.

Needless to say, the above-mentioned cooling method may be used not only for the production of frozen soybean curd but also for the cooling of any substance that needs rapid cooling.

The present invention may be used as a method of treating material (14) under isostatic pressure in a pressure vessel (1), said method comprising applying pressure to the material (14) together with a frozen body (15) composed mainly of water whose amount is in an arbitrarily selected ratio to the weight of the material, thereby bringing the average temperature of the material (14) to the vicinity of the predetermined temperature after pressurization.

This method may be used in the case where the material to be treated is a liquid and it is necessary to prevent the material from rising in temperature (so that treatment is performed below a prescribed temperature) when it is compressed together with ice. This is demonstrated by the following experiment.
Experiment 2

Figure 3:
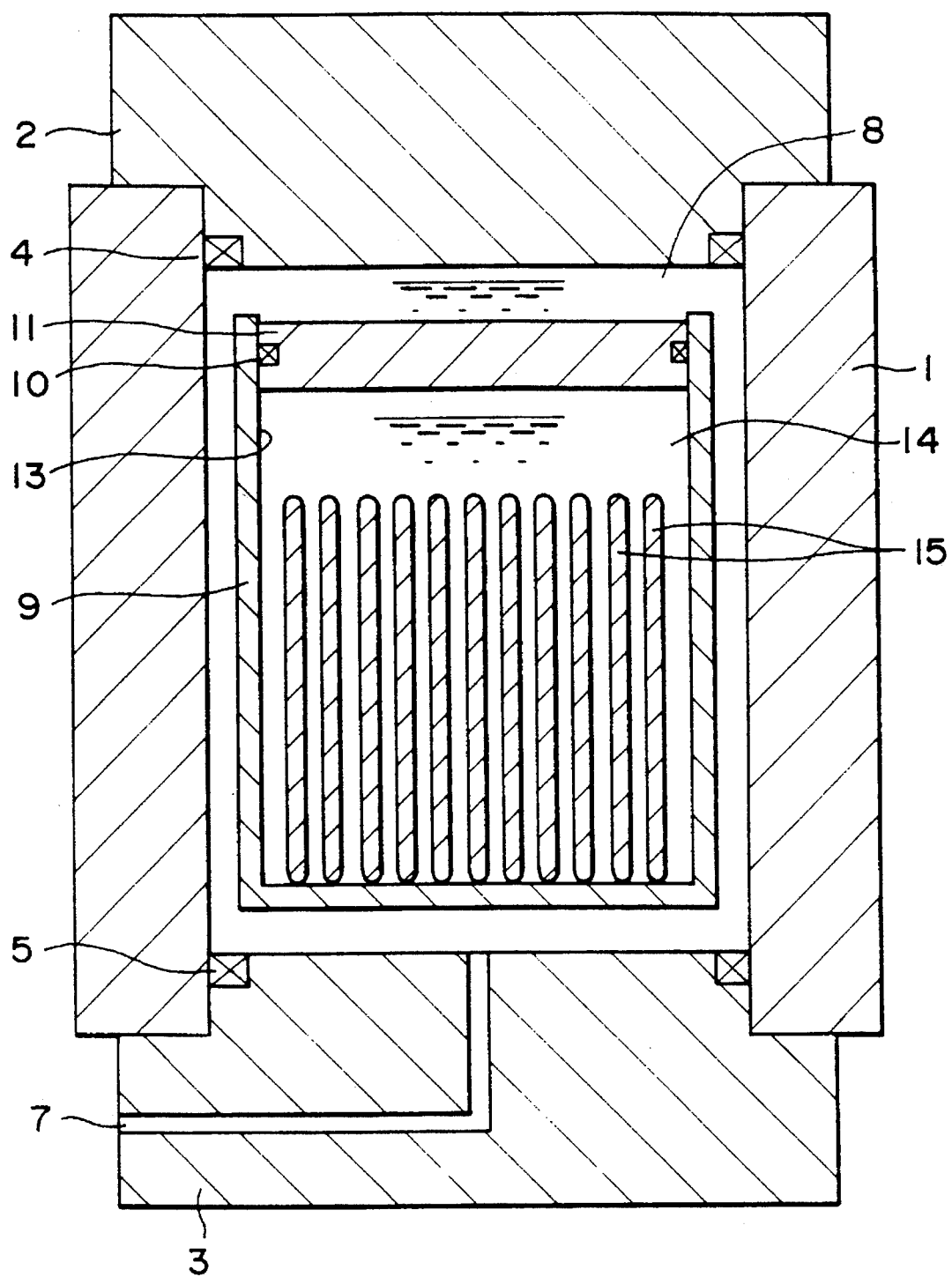
FIG. 3 is a sectional view of the apparatus used in the second experiment.

An experiment was carried out using an apparatus shown in FIG. 3. This apparatus is similar in structure to that used in Experiment 1. The material (14) to be treated is tangerine juice (5 liters=5000 g×1 cal/° C.) cooled to 2° C. The tangerine juice was inoculated with $10^5$/ml of *Escherichia coli* (IFO 3301). The tangerine juice was poured directly into the treating container (9). The treating container (9) was immersed in the pressure medium (8), which is water at 15° C., with the pressure vessel (1) not cooled. The pressure medium was pressurized to 2000 kgf/cm$^2$ within 1 minute, and this pressure was kept for 5 minutes, and the pressure was released within 1 minute. During pressurization, the temperature of the tangerine juice reached 6° C. (maximum). After depressurization, the number of bacteria which survived was $2\times10^1$/ml.

An experiment for comparison was carried out under the same conditions as mentioned above, except that the tangerine juice was incorporated with 40 ice sticks, each measuring 8 mm in diameter and 160 mm long, each tightly sealed in a polyethylene bag. The total amount of ice is 320 g, with a specific heat of 25000 cal. It was found that the maximum temperature the tangerine juice reached was 3° C. and bacteria which survived after depressurization were not detected. This demonstrates that pressurization at a low temperature promotes sterilization. In other words, the low temperature of the tangerine juice, which promotes sterilization, is due to the melting of ice under pressure and the rapid cooling by the release of latent heat.

The frozen body (15) composed mainly of water may be that of an aqueous solution of a solute such as a salt which lowers the freezing point of water. The cooling efficiency in this case is higher than in the case where the frozen body is ice of nearly pure water (such as tap water). The higher the cooling efficiency, the shorter the time required for cooling. This principle is explained with reference to FIGS. 4 and 5.

Figure 4:
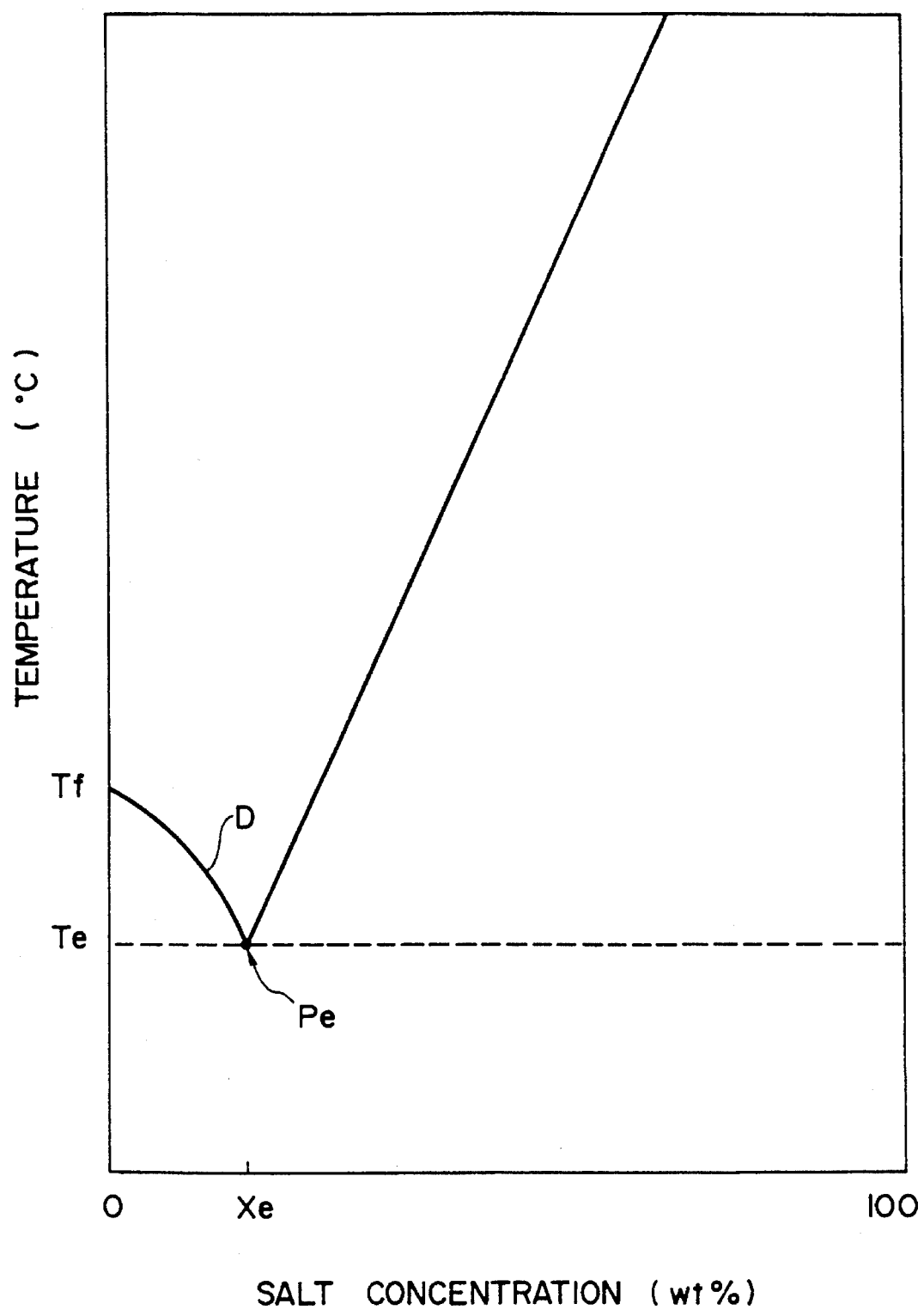
FIG. 4 is a temperature-concentration relation of a binary mixture (water+a salt) at a fixed pressure.

FIG. 4 shows the freezing point depression curve of an aqueous solution of a salt (e.g., potassium chloride) under a certain pressure (e.g., atmospheric pressure). $T_f$ on the temperature scale denotes the freezing point of water, which is 0° C. The freezing point of an aqueous solution of potassium chloride decreases to some extent as the concentration of potassium chloride increases, as indicated by the curve (D) connecting $T_f$ and $P_e$. The point $P_e$ at which the freezing point depression is maximum is called eutectic point.

The composition corresponding to the eutectic point is referred to as eutectic point composition $X_e$, and the temperature corresponding to it is referred to as eutectic point temperature $T_e$. It is known from literature that $X_e$=19.9 wt % and $T_e$=−10.7° C. for an aqueous solution of potassium chloride. In other words, a 19.9 wt % aqueous solution of potassium chloride has a freezing point of −10.7° C.

In FIG. 5, $T_f$ represents the freezing point of water (which is 0° C.); the solid line (B) represents the boundary of two phases where the liquid phase (water) and solid phase (ice) coexist; $T_e$ represents the eutectic point temperature of an aqueous solution of a salt (e.g., potassium chloride) under atmospheric pressure; and the broken line (C) represents the locus of the eutectic point of the aqueous solution of potassium chloride. Assume that the material is compressed such that its temperature ($T_1$) and pressure ($P_1$) reach the point A and then the material is cooled under pressure by the frozen body. Then, the temperature of the material goes down to $T_2$ or $T_3$ depending respectively on whether the frozen body is ordinary ice or an aqueous solution of potassium chloride in eutectic composition. It follows, therefore, that the temperature difference between the material and the frozen body is greater in the latter case. This leads to rapid cooling.

The above-mentioned description may apply principally to any substance that lowers the freezing point of water. In the case where foods are involved, it is desirable to use a substance which is approved as a food additive by the Food Sanitation Law. Preferred examples for industrial use include potassium chloride and sodium chloride (common salt) which are readily available and easy to handle.

Experiment 3

An experiment was carried out with a commercial package of soybean curd measuring 10×10×3.5 cm (which is slightly larger than the sample used in Experiment 1). After cooling to 5° C., it was placed on a frozen body of distilled water measuring 10×10×1.0 cm. They were immersed in distilled water cooled to 5° C. and then pressurized to 1000 kgf/cm$^2$ within 1 minute using the same apparatus as used in Experiment 1. After the lapse of a certain period of time, the pressure was released within 1 minute.

On the other hand, the same soybean curd as mentioned above was placed on a frozen body (10×10×1.0 cm) of a 19.9 wt % aqueous solution of potassium chloride. They were immersed in a 19.9 wt % aqueous solution of potassium chloride which had been cooled to 5° C. and then pressurized to 1000 kgf/cm$^2$ within 1 minute using the same apparatus as used in Experiment 1. After the lapse of a certain period of time, the pressure was released within 1 minute.

The frozen soybean curd was cut after the treatments mentioned above and its internal state was observed. In the case of cooling with ice, it was necessary to keep compression (1000 kgf/cm$^2$) for at least 25 minutes in order to obtain frozen soybean curd in which fine ice crystals are uniformly dispersed. In the case of cooling with a frozen body of an aqueous solution of potassium chloride, the time required to keep compression was reduced to 7 minutes.

The foregoing results suggest that it is possible to greatly shorten the process time if the frozen body to rapidly cool the material (such as food) below 0° C. under pressure is that of an aqueous solution of a solute such as a salt which lowers the freezing point of water.

[Effect of the invention]

The present invention is designed to isostatically exert pressure on the material and frozen body composed mainly of water both of which are immersed in a pressure medium. The pressure lowers the freezing point of the frozen body, permitting the rapid cooling (or temperature control) of the material in the pressure vessel. Upon release of the pressure, the material (food) is instantaneously frozen and kept frozen under atmospheric pressure. This process can be applied to the industrial production of new foods such as frozen soybean curd. Moreover, this process obviates the necessity of cooling the pressure vessel because the material is cooled by direct contact with the frozen body in a heat-insulated container. This leads to cost reduction for industrial production. In addition, it is possible to shorten the process time by using a frozen body of an aqueous solution of a solute such as a salt which lowers the freezing point of water. The process is safe for foods if the salt is selected from substances approved as food additives by the Food Sanitation Law.

What is claimed is:

1. A method of reducing the temperature of a material (14) to a predetermined level, which comprises:

placing at least one body of the material (14) in a pressure vessel (1), with each body (14) in contact with a frozen body (15) composed mainly of water, the amount of which is an arbitrarily selected ratio relative to the weight of the material (14); and subjecting the contacting bodies to isostatic pressure by a treating medium in said vessel, thereby reducing the average temperature of material (14) to the vicinity of said predetermined temperature.

2. A method of reducing the temperature of a water-containing food material (14) to a predetermined level, comprising:

placing at least one body of a water-containing food material (14) in a pressure vessel (1), with each body (14) in contact with a frozen body (15) composed mainly of water, and said pressure vessel containing a treating medium (12);

subjecting the contacting bodies to isostatic pressure by said treating medium in said vessel and maintaining the pressure such that the food material (14) does not freeze at its average temperature below 0° C.; and releasing pressure in the vessel rapidly, thereby forming ice crystal nuclei in food material (14).

3. A method as defined in claim 2, wherein the material (14), which is a water-containing food, and the frozen body (15) composed mainly of water each is airtightly sealed in a bag, with the former being placed on the latter.

4. A method of as defined in claims 2 and 3, wherein the material (14) and the frozen body (15) are placed in a heat-insulating vessel (9) containing the medium (12).

5. A method as defined in claims 2 and 3, wherein the material (14) in which ice crystal nuclei have been formed undergoes freezing under atmospheric pressure.

6. A method as defined in claims 2, wherein the frozen body (15) composed mainly of water is a frozen body of an aqueous solute containing solution which lowers the freezing point of water.

7. A method as defined in claim 6, wherein said solute is a salt.

8. A method as defined in claim 1 or 2, wherein said treating medium is an aqueous solution of propylene glycol.

9. An apparatus for treating material under pressure, said apparatus comprising a pressure vessel (1) having therein a high-pressure chamber (6) which can be supplied with a pressure medium (8), a treating vessel (9) in said high-pressure chamber (6), said treating vessel (9) having therein a treating compartment (13) containing a pressure medium (12) to apply isostatic pressure, and a plurality of trays (16) removably arranged in the treating compartment (13) in its axial direction, each of said trays holding the material (14) and the frozen body (15) composed mainly of water.

10. An apparatus for treating material under pressure as defined in claim 9, wherein the frozen body (15) composed mainly of water is a frozen body of an aqueous solute containing solution which lowers the freezing point of water.

11. An apparatus as defined in claim 10, wherein said solute is a salt.

* * * * *